United States Patent
Mukaide

(10) Patent No.: US 7,604,683 B2
(45) Date of Patent: Oct. 20, 2009

(54) GAS SEPARATION METHOD USING ADSORBENT

(75) Inventor: Taihei Mukaide, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 11/449,725

(22) Filed: Jun. 9, 2006

(65) Prior Publication Data

US 2006/0278077 A1 Dec. 14, 2006

(30) Foreign Application Priority Data

Jun. 14, 2005 (JP) .............................. 2005-173663

(51) Int. Cl.
*B01D 53/02* (2006.01)
(52) U.S. Cl. .............................. 95/103; 95/106; 95/127; 95/148
(58) Field of Classification Search ................ 95/96, 95/103, 106, 127, 148; 96/108, 130
See application file for complete search history.

(56) References Cited

U.S. PATENT DOCUMENTS

| | | | |
|---|---|---|---|
| 4,756,723 A * | 7/1988 | Sircar | 95/103 |
| 5,648,508 A | 7/1997 | Yaghi | |
| 5,783,162 A | 7/1998 | Tomita et al. | |
| 6,478,854 B1 | 11/2002 | Kotagiri et al. | |
| 6,544,318 B2 * | 4/2003 | Dee et al. | 95/96 |
| 2002/0048689 A1 | 4/2002 | Igarashi et al. | |
| 2006/0014954 A1 | 1/2006 | Mukaide | |

FOREIGN PATENT DOCUMENTS

| | | |
|---|---|---|
| EP | 0 790 253 A2 | 8/1997 |
| EP | 1 245 659 A1 | 7/2007 |
| JP | 2004-074025 A | 3/2004 |
| JP | 2004-231639 A | 8/2004 |

OTHER PUBLICATIONS

Kevin R. Roesch et al., "Synthesis of Isoquinolines and Pyridines by the Palladium- and Copper-Catalyzed Coupling and Cyclization of Terminal Acetylenes," 1(4) Organ. Lett. 553-56 (1999).
International Tables for Crystallography, 3rd Revised Ed., vol. A, pp. 4-5 (1992).

* cited by examiner

*Primary Examiner*—Robert A Hopkins
(74) *Attorney, Agent, or Firm*—Fitzpatrick, Cella, Harper & Scinto

(57) ABSTRACT

A gas separation method for separating a specific component gas from a mixed gas using an adsorbent comprises (1) a contact step of bringing a mixed gas into a vessel to contact at a first pressure the mixed gas with an adsorbent whose adsorption property with respect to a specific component gas exhibits hysteresis, (2) a decompression step of decompressing the mixed gas in the vessel to a second pressure which is lower than the first pressure and which is within the hysteresis range, and (3) a desorption step of causing adsorbed matter to detach by placing the adsorbent at a third pressure which is lower than the second pressure and which is outside of the hysteresis range and/or by heating the adsorbent.

8 Claims, 4 Drawing Sheets

GAS SEPARATION METHOD USING ADSORBENT

BACKGROUND OF THE INVENTION

1. Field of the Invention

The present invention relates to an adsorbent for gas, and a gas separation and purification method using the same.

2. Related Background Art

Examples of gas separation and purification methods include methods which employ a chemical reaction against an impurity gas. U.S. Pat. No. 5,783,162 proposes feeding hydrogen into a mixed gas containing oxygen to convert the oxygen into water for removal.

On the other hand, various porous materials have been employed in the past as adsorbents for gas. These porous materials are classified into microporous materials with a pore size of 2 nm or less, mesoporous materials with a pore size of from 2 to 50 nm, or macroporous materials with a pore size of 50 nm or more, and are used according to the size of the adsorbed gas molecule. Furthermore, methods that use an adsorbent which selectively adsorbs an impurity gas for impurity gas separation are often employed. Known methods include, for example, PSA (Pressure Swing Adsorption) which utilizes the difference in the adsorption of argon; and PTSA (Pressure and Temperature Swing Adsorption) which utilizes the difference in the adsorption of argon depending on pressure and the difference in the adsorption depending on temperature. U.S. Pat. No. 6,478,854 proposes a method for separating nitrogen from air using zeolite as an adsorbent which specifically adsorbs nitrogen. Japanese Patent Application Laid-Open No. 2004-074025 proposes an adsorbent obtained by coating a conventional adsorbent with an adsorbent whose adsorption/desorption properties exhibit hysteresis.

In a gas separation method which uses a conventional adsorbent, it is necessary to select an adsorbent which selectively and abundantly adsorbs only the desired gas, and which does not adsorb other constituents. If constituents other than the desired gas are adsorbed, the adsorption pressure of the constituent gas which is to be separated needs to be sufficiently separated from the adsorption pressure of the other constituent gases.

SUMMARY OF THE INVENTION

It is an object of the present invention to provide a gas separation method which does not use an adsorbent that selectively adsorbs constituents.

According to an aspect of the present invention, there is provided a gas separation method for separating a specific component gas from a mixed gas using an adsorbent, comprising:

(1) a contact step of bringing a mixed gas into a vessel to contact at a first pressure the mixed gas with an adsorbent whose adsorption property with respect to a specific component gas exhibits hysteresis;

(2) a decompression step of decompressing the mixed gas in the vessel to a second pressure which is lower than the first pressure and which is within the hysteresis range; and (3) a desorption step of causing adsorbed matter to detach by placing the adsorbent at a third pressure which is lower than the second pressure and which is outside of the hysteresis range and/or by heating the adsorbent.

In the gas separation method, a gas detached in the desorption step is preferably collected, and the contact step, the decompression step and the desorption step are repeated with the collected gas as a new mixed gas.

The gas exhausted from the vessel during the decompression step and the gas left in the vessel after the decompression step are preferably recovered, and the contact step, the decompression step and the desorption step are preferably repeated with the recovered gas as a new mixed gas.

In the gas separation method, a partial pressure of the specific component gas at the first pressure is preferably equal to or greater than a saturated vapor pressure of the specific component gas.

The specific component gas is preferably argon.

The adsorbent is preferably an organic metal complex represented by the following general formula (1):

$$M \cdot L_3 \quad (1)$$

wherein M represents a metal atom; L represents a ligand; the ligand L is comprised of cyclic groups A and B each of which has or does not have a substituent, and the substituent possessed by the cyclic groups A and B is a halogen atom, a nitro group or a trialkylsilyl group, wherein the alkyl group is independently a linear or branched alkyl group having 1 to 8 carbon atoms. The general formula (1) is preferably represented by the following general formula (2):

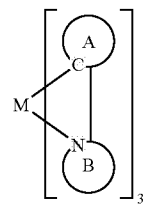

(2)

wherein circle A and circle B represent the cyclic groups A and B; C and N are respectively a ring member atom; the line directly linking the cyclic groups A and B represents a bond or a linear or branched alkyl group having 1 to 20 carbon atoms, wherein one methylene group or two or more methylene groups not adjacent to each other in the alkyl group may be substituted with —O—, —S—, —CO—, —CO—O—, —O—CO—, —CH═CH— or —C≡C—, and a hydrogen atom in the alkyl group can be substituted with a fluorine atom.

According to another aspect of the present invention, there is provided a method for producing argon gas comprising the above argon separation method in the process, wherein the specific component gas is argon.

According to still another aspect of the present invention, there is provided a method for producing nitrogen gas comprising the above nitrogen separation method in the process, wherein the mixed gas comprises nitrogen, and the specific component gas is argon.

According to the present invention, the separation of gases having similar values for their molecular weight and molecular size is possible, such as separation of argon and nitrogen, which was conventionally possible only by using certain adsorbents.

DETAILED DESCRIPTION OF THE PREFERRED EMBODIMENTS

Figure 1:
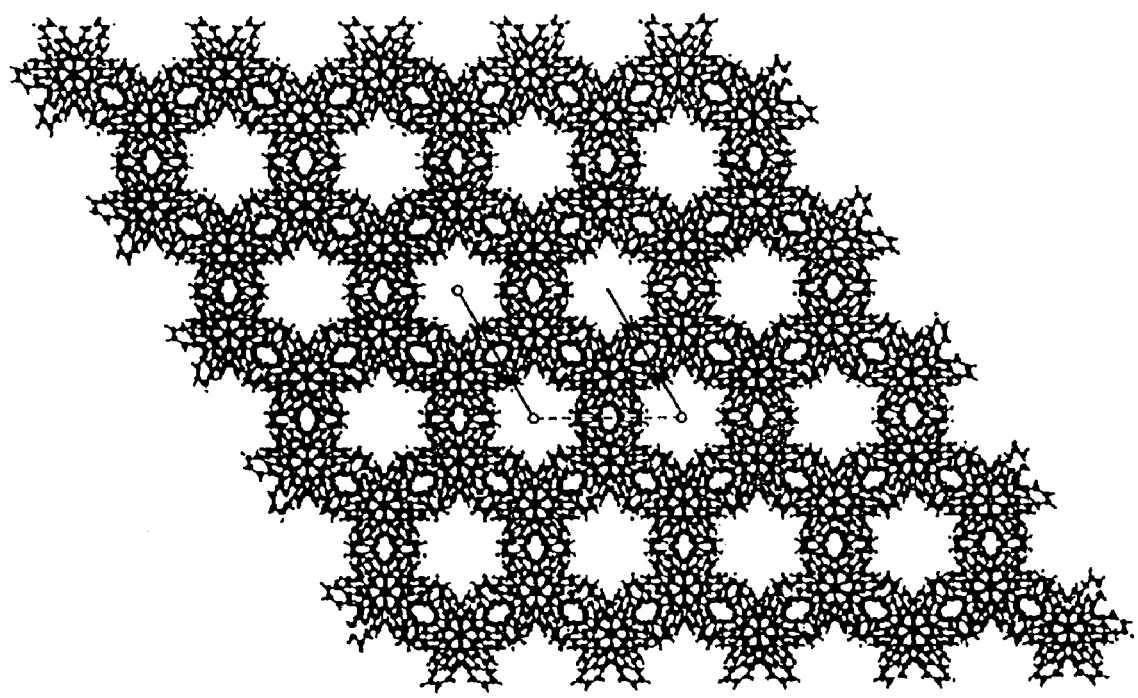
FIG. 1 is a crystal structure of the adsorbent for gas used in the present invention.

Embodiments of the present invention will now be explained in more detail.

The gas separation method according to the present invention utilizes the difference in an organic metal complex between an amount of the adsorbed matter in the step wherein gas pressure is lowered (hereinafter referred to as "adsorbed amount in desorbing-stage") and an amount of the adsorbed matter in the step wherein gas pressure is raised (hereinafter referred to as "adsorbed amount in adsorbing-stage"). In addition, a purification in the method of the present invention is conducted by separating a specific gas component such as argon in a mixed gas by repeating the contact and decompression steps against the mixed gas.

The adsorbent for gas used in the present invention is an organic metal complex having pores whose diameter is 2 nm or less (i.e. micropores), and whose gas adsorption/desorption isotherm as measured at a temperature at which separation is carried out has hysteresis with respect to at least one gas in the mixed gas which is to be separated.

Micropores are suitable for the adsorption of a gas having a small molecular weight, such as nitrogen or argon. The intended gas to be adsorbed for the gas separation and purification method according to the present invention is preferably argon.

The hysteresis preferably has a broad width over a low pressure range. Specifically, the hysteresis as measured at a liquid nitrogen temperature preferably has a hysteresis loop region having a ratio of the adsorbed amount in desorbing-stage to the adsorbed amount in adsorbing-stage of 1.20 or greater at a relative pressure of from 0.05 to 0.1 with respect to the saturated vapor pressure.

If the hysteresis width is small, the separation and purification of the impurity gas has to be carried out many times, which causes a decline in efficiency. No particular upper limit exists for the hysteresis width, and a greater width allows separation and purification to be carried out more efficiently.

Adsorbents which can be preferably used in the present invention include the following materials, which were proposed by the present inventors in Japanese Patent Application Laid-Open No. 2004-231639; i.e. organic metal complexes whose pores have a pore size of 2 nm or less as represented by the general formula (1). More preferable are materials represented by the general formula (2).

Preferably, at least one of the cyclic groups A and B bonded to the metal atom M in the general formulae (1) and (2) is selected from the group consisting of pyridine, pyrimidine, pyrazoline, pyrrole, pyrazole, quinoline, isoquinoline, imidazole, quinone, benzoazepin, catechol, phenol, phenyl, naphthyl, thienyl, benzothienyl, quinolyl, phenothiazine, benzothiazole, benzoxazole, and benzoimidazole. More preferable are phenyl and isoquinoline.

Examples of the metal atom M of general formulae (1) and (2) include cobalt and iridium. Preferred is iridium.

A synthesis route of an organic metal complex compound represented by general formula (2) is disclosed in Kevin R. et al., Org. Lett., 1999, 1, 553-556. Using an iridium ligand compound as an example, a synthesis route will be explained below.

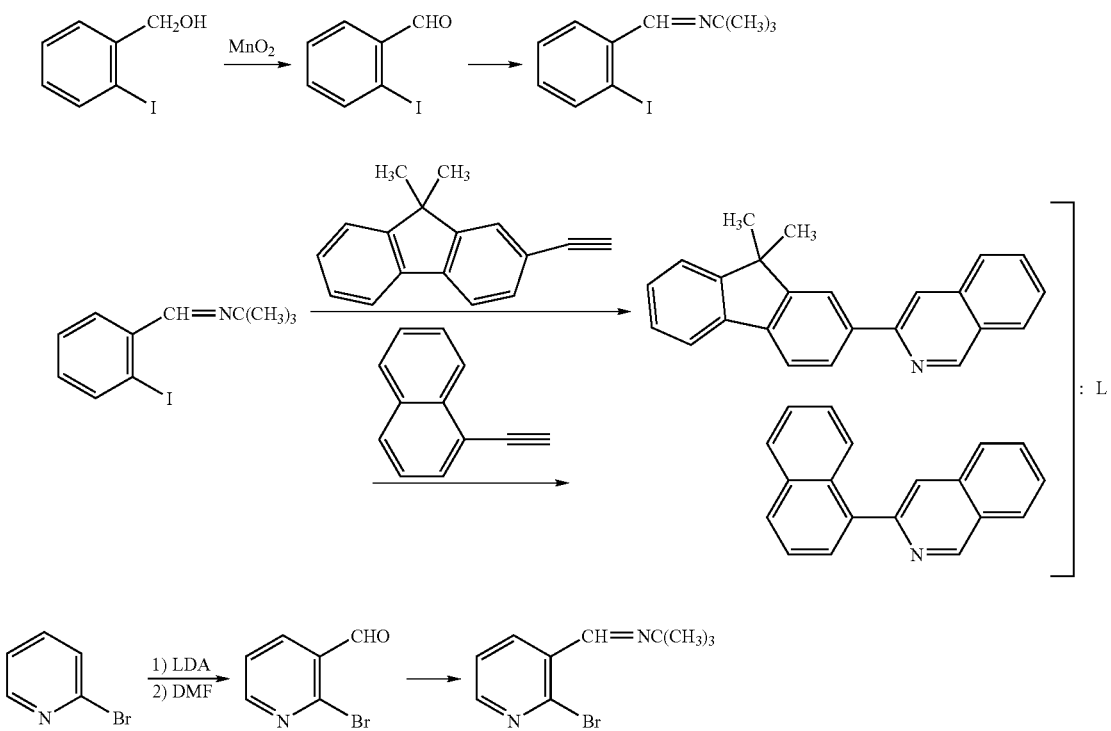

-continued

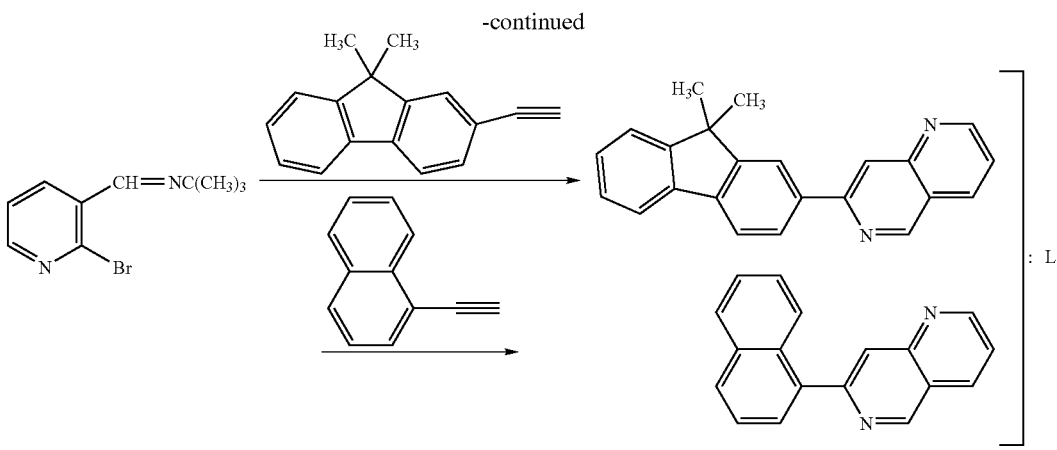

Synthesis of an Iridium Ligand Compound

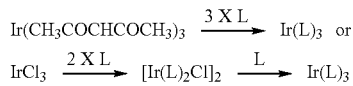

(wherein either of the above reactions may be used)

In the formula, "L" represents a ligand.

An organic metal complex having 2 nm or less pores can be obtained by dissolving the resulting compound in a solvent and then precipitating.

The mechanism of the present invention will now be described in more detail using the example of a two component gas consisting of argon and nitrogen.

In the contact step, almost the same amounts of nitrogen and argon are adsorbed if their relative pressures with respect to the saturated vapor pressure are about the same. That is, the adsorbent according to the present invention does not selectively absorb only one of the argon or nitrogen.

Thus, with regards to adsorption, since nitrogen and argon behave as if they were the same molecule, nitrogen and argon are adsorbed in roughly the same ratio as their gas molar ratio even on the adsorbent. Therefore, without some kind of change, the adsorbed gases and the remaining gases will have the same composition as the source gas, meaning that no separation occurs.

However, in the adsorbent according to the present invention, argon is not easily detached during the decompression step in which pressure is reduced, thus showing hysteresis properties. If this is utilized, the nitrogen and argon can be separated. This will now be explained below.

In the contact step, a source gas in contact with the adsorbent at a pressure p1 set to be at or above the argon saturated vapor pressure reaches adsorption equilibrium once a sufficient period of time has passed.

Next, as the decompression step, the pressure of the system which has reached equilibrium is lowered from p1 to a second pressure p2. The second pressure p2, in which the argon partial pressure is within a hysteresis range, is set at as low a pressure as possible such that the adsorption of argon is maintained, and, a large amount of nitrogen is detached. Therefore, by lowering the system pressure to p2, some of the nitrogen molecules detach from the adsorbent and return to the gas, whereby the adsorption of nitrogen in the absorbent material is lowered. However, hardly any of the argon detaches, so that the original adsorption is maintained. As a result, the argon ratio with respect to nitrogen on the adsorbent increases. In contrast, the argon ratio in the gas which is exhausted from the space of the system during the decompression step (hereinafter referred to as "exhausted gas") and the argon ratio in the gas which is left and occupies the space of the system after the decompression step (hereinafter referred to as "residual gas") decrease as compared with the source gas, resulting in the nitrogen content increasing. By collecting these exhausted and residual gases and repeating the contact and decompression steps with the collected gases as the source gas, the nitrogen content of these gases can be further increased.

As the desorption step, the adsorbent is subjected to a third pressure lower than the second pressure and outside of the hysteresis range and/or heated, whereby adsorbed matter is caused to detach from the adsorbent, and the resulting discharged gas is collected.

The mixed gas in the adsorption tank is introduced into the recovery tank 6 as a consequence of the pressure being lowered from p1 to p2. As described above, this mixed gas is a mixed gas having an increased nitrogen content as compared with the source gas. By again introducing the mixed gas into the adsorption tank and repeating the above steps, the nitrogen content can be further increased. In cases where recovery is unnecessary, the recovery tank 6 is not provided, and the mixed gas may be exhausted as is.

EXAMPLES

The present invention will be now be described in more detail with reference to examples. However, the present invention is not limited to these examples.

Method for Forming the Material

An organic metal complex represented by general formula (2), wherein M denotes iridium, A denotes phenyl and B denotes isoquinoline, was synthesized according to the following procedure.

69.3 g of isoquinoline N-oxide (448 mmol) manufactured by Tokyo Chemical Industry Co., Ltd. and 225 ml of chloroform were introduced into a 1 L-three-neck flask dissolved therein. Then, 219.6 g (1,432 mmol) of phosphorous oxychloride was slowly added dropwise therein and stirred under ice-cooling while maintaining the inner temperature at 15 to 20° C. Thereafter, the mixture was heated and stirred under reflux for 3 hours. The reaction product was left to cool to room temperature, and the resulting product was poured into ice water. The mixture was extracted with ethyl acetate, and the organic layer was washed with water until it was neutral. The solvent was then dried under reduced pressure. The residue was purified using silica gel column chromatography (eluent: chloroform/hexane: 5/1) to yield 35.5 g of 1-chloroisoquinoline white crystals (44.9% yield).

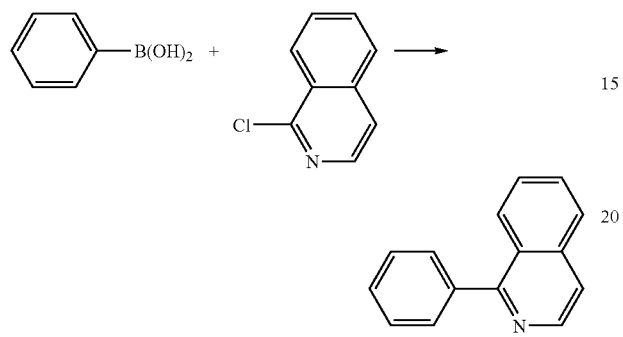

3.04 g of phenylboronic acid (24.9 mmol) and 4.09 g of 1-chloroisoquinoline (25.0 mmol), 25 ml of toluene, 12.5 ml of ethanol, and 25 ml of a 2M sodium carbonate aqueous solution were introduced into a 100 ml-three-neck flask. With stirring at room temperature under a nitrogen gas flow, 0.98 g (0.85 mmol) of tetrakis-(triphenylphosphine) palladium (0) was added to the mixture. Thereafter, the resultant was stirred under reflux under a nitrogen gas flow for 8 hours. After completion of the reaction, the reaction product was cooled, and then extracted with cool water and toluene. The organic layer was washed with saline and dried with magnesium sulfate, and then the solvent was dried under reduced pressure. The residue was purified using silica gel column chromatography (eluent: chloroform/methanol: 10/1), to yield 2.20 g of 1-phenylisoquinoline (43.0% yield).

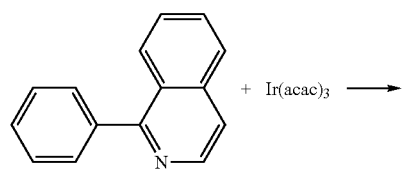

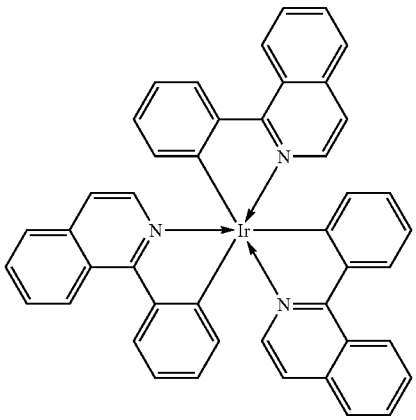

50 ml of glycerol was introduced into a 100 ml-four-neck flask, and then stirred and heated at 130 to 140° C. for 2 hours while bubbling with nitrogen gas. The glycerol was left to cool to 100° C., and then 1.03 g (5.02 mmol) of 1-phenylisoquinoline and 0.50 g (1.02 mmol) of iridium (III) acetylacetonate were added. The reaction mixture was stirred and heated for 7 hours at around 210° C. under a nitrogen gas flow. After being left to cool to room temperature, the reaction product was added to 300 ml of 1N-hydrochloric acid, and the resulting precipitate was filtered and then washed with water. The precipitate was purified using silica gel column chromatography with chloroform used as an eluent, to yield 0.22 g of a red powder of iridium (III) tris(1-phenylisoquinoline) (26.8% yield). FIG. 1 illustrates the crystal structure of the iridium (III) tris(1-phenylisoquinoline) as obtained from single crystal structure analysis. As can be seen from FIG. 1, this crystal had pores with a diameter of about 0.8 nm.

Measurement of Adsorption/Desorption Properties

The resulting iridium (III) tris(1-phenylisoquinoline) powder was dried at 120° C. for 12 hours under $1\times10^{-3}$ Pa or less, and formed into an adsorbent. Measurement of the respective nitrogen $N_2$ gas and the argon gas adsorption/desorption isotherms with respect to this adsorbent were carried out at a liquid nitrogen temperature using a gas adsorption measuring system. The measurement results are shown in Table 1. In Table 1, the units of adsorption are cc/g.

TABLE 1

| | | $P/P_0$ | | | | | | | | | |
|---|---|---|---|---|---|---|---|---|---|---|---|
| | | 0.05 | 0.1 | 0.2 | 0.3 | 0.4 | 0.5 | 0.6 | 0.7 | 0.8 | 0.9 |
| Nitrogen | Adsorbed amount in desorbing-stage | 97 | 106 | 115 | 123 | 129 | 135 | 140 | 147 | 153 | 160 |
| | Adsorbed amount in adsorbing-stage | 97 | 105 | 115 | 123 | 129 | 135 | 140 | 147 | 152 | 159 |
| | Adsorption ratio | 1.00 | 1.01 | 1.00 | 1.00 | 1.00 | 1.00 | 1.00 | 1.00 | 1.01 | 1.01 |
| Argon | Adsorbed amount in desorbing-stage | 169 | 172 | 173 | 174 | 175 | 175 | 175 | 174 | 174 | 174 |
| | Adsorbed amount in adsorbing-stage | 135 | 140 | 144 | 148 | 151 | 155 | 158 | 161 | 165 | 169 |
| | Adsorption ratio | 1.25 | 1.23 | 1.20 | 1.18 | 1.16 | 1.13 | 1.11 | 1.08 | 1.05 | 1.03 |

Figure 2:
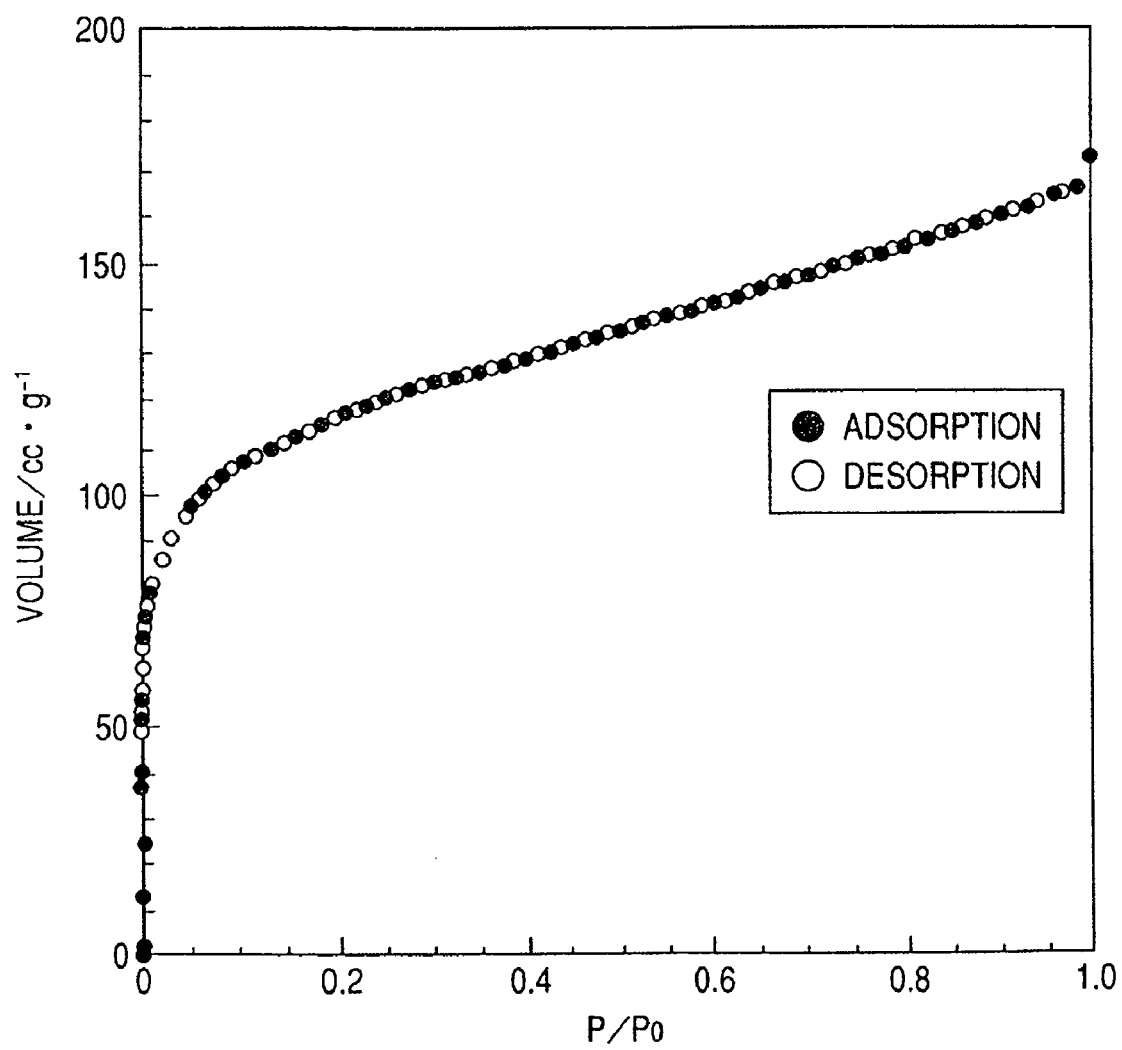
FIG. 2 illustrates an adsorption/desorption isotherm of $N_2$ at a liquid nitrogen temperature of the adsorbent for gas used in the present invention.
Figure 3:
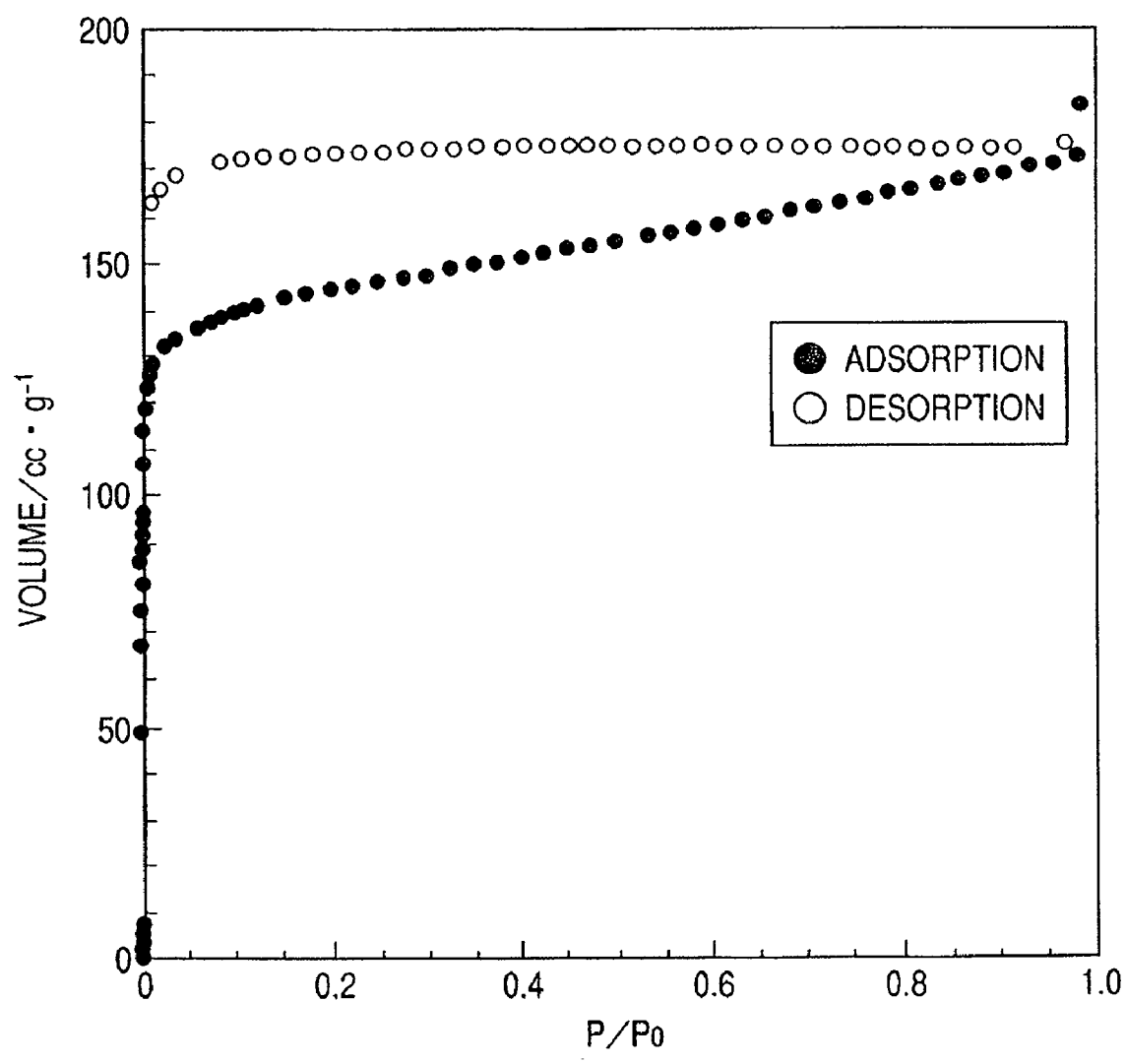
FIG. 3 shows the adsorption/desorption isotherm of Ar at a liquid nitrogen temperature of the adsorbent for gas used in the present invention.

The measurement results shown in Table 1 are illustrated as graphs in FIGS. 2 and 3. The $N_2$ adsorption/desorption isotherm is illustrated in FIG. 2, and the Ar adsorption/desorption isotherm is illustrated in FIG. 3. The horizontal axis $P/P_0$ of the graphs in FIGS. 2 and 3 represents values obtained by dividing the pressure P of the measured gas, i.e. nitrogen gas or argon gas, by the saturated vapor pressure $P_0$ of the same gas. Here, the nitrogen saturated vapor pressure was 747 mm Hg, and the argon saturated vapor pressure was 200 mm Hg. The vertical axis represents the volume of adsorbed gas per 1 gram of adsorbent. In both of the graphs "●" represents the adsorbed amount in adsorbing-stage and "○" represents the adsorbed amount in desorbing-stage.

As shown in Table 1 and FIGS. 2 and 3, while nitrogen has an adsorption/desorption isotherm without any hysteresis, argon possesses an extremely large hysteresis. The ratio of the argon adsorbed amount in desorbing-stage to the adsorbed amount in adsorbing-stage at a ratio $P/P_0$ of 0.05 is 1.25, thus exhibiting very distinctive adsorption/desorption properties. If this adsorbent is used, by repeating the contact and decompression steps against a mixed gas consisting of argon gas and a different kind of gas as an impurity gas, or a mixed gas consisting of nitrogen gas and argon gas as an impurity gas, separation of the impurity gas and purification of the resulting gas becomes possible.

Gas Separation Method

Figure 4:
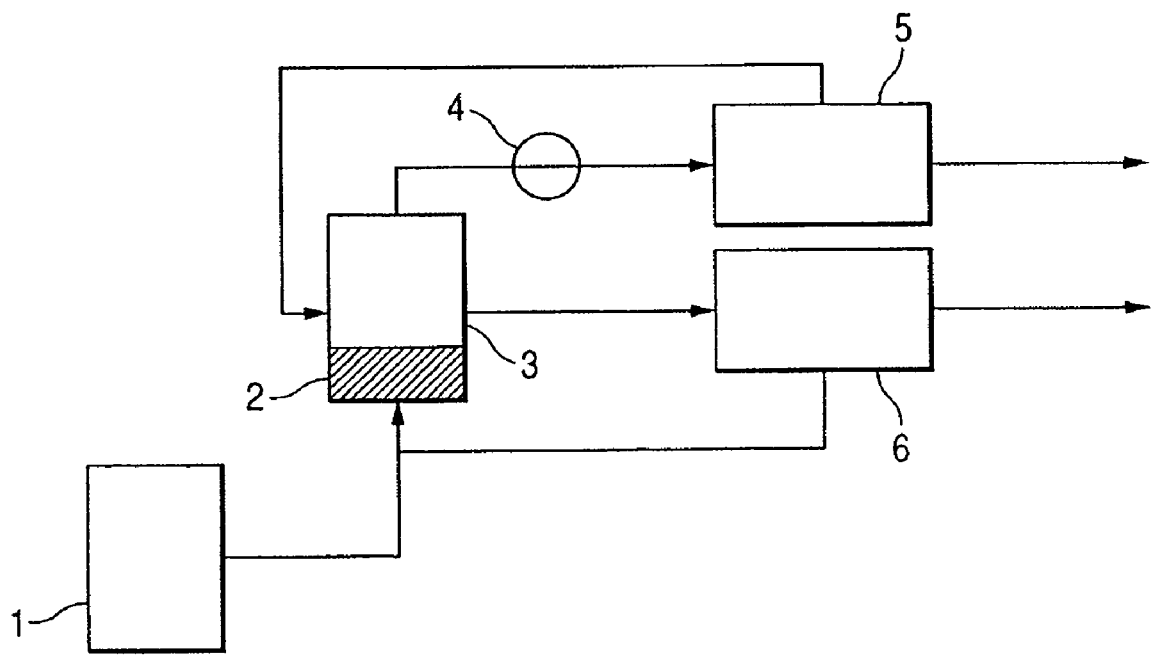
FIG. 4 is a diagram explaining the gas separation method according to the present invention.

FIG. 4 illustrates a schematic diagram of the gas separation system according to the present invention.

The gas separation system according to the present invention comprises a source gas supply apparatus 1 for supplying a mixed gas of the source materials, an adsorption tank 3, which is a sealed vessel provided with the adsorbent 2 of Example 1, a pump 4, a collection tank 5 for collecting gas desorbed from the adsorbent 2, and a recovery tank 6 for recovering from the adsorption tank gas that was not adsorbed by the adsorbent 2. The tanks are all connected with pipes, whose flow can be controlled by opening or closing valves provided therealong (not shown).

As the contact step, a mixed gas consisting of argon gas and $N_2$ gas as an impurity gas (hereinafter referred to as "argon source gas") is introduced into the adsorption tank 3 from the supply apparatus 1 at a pressure of p1. Alternatively, the pressure p1 may be applied after introducing the mixed gas into the adsorption tank 3. The pressure p1 is set equal to or greater than the saturated vapor pressure of argon. Partial pressure is determined by the molar ratios of nitrogen and argon, so that if the molar content of nitrogen is taken as "x", then the molar content of argon will be 1−x. The nitrogen partial pressure is therefore x·p1, and the argon partial pressure is (1−x)·p1. When the nitrogen content is low, the argon partial pressure will comprise most of the total pressure.

Both nitrogen and argon are adsorbed onto the adsorbent 2 in the adsorption tank.

As the decompression step, the pressure of the gas in the adsorption tank 3 which has reached equilibrium is lowered to pressure p2. Pressure p2, in which the argon partial pressure is within the hysteresis range, is set at as low a pressure as possible such that the adsorption is maintained, and, the detachment of nitrogen proceeds in an abundant manner. When the nitrogen content is so low that it can be ignored, p1 is preferably set at the argon saturated vapor pressure of 200 mm Hg, and p2 is preferably set in the vicinity of the lower limit pressure of the hysteresis range, between 10 mm Hg and 20 mm Hg.

The mixed gas in the adsorption tank 3 is introduced into the recovery tank 6 as a consequence of the pressure being lowered from p1 to p2. As described above, this mixed gas is a mixed gas having an increased nitrogen content as compared with the source gas. By again introducing this mixed gas into the adsorption tank 3 and repeating the contact and decompression steps, the nitrogen content can be further increased. In cases where recovery is unnecessary, the recovery tank 6 is not provided, and the mixed gas may be exhausted as is.

In the desorption step, adsorbed matter is detached from the adsorbent 2 of the adsorption tank 3, and the resulting discharged gas is collected in the collection tank 5. This step is carried out at a pressure lower than the hysteresis range by further reducing the pressure in the adsorption tank with a vacuum pump 4. Alternatively, the adsorbent can be heated to raise the temperature, thereby causing detachment. Once detachment is finished, the regenerated adsorbent 2 may be employed in the adsorption tank 3 for the next adsorption.

The gas collected in the collection tank 5 has a higher argon content than the source gas, so that the source gas has become a more purified gas. By again introducing this into the adsorption tank 3 and repeating the above steps, purification can be further carried out. In cases where recovering the argon is unnecessary, the collection tank 5 is not provided, and the mixed gas may be exhausted as is.

As explained above, the adsorbent employed in the present invention does not selectively adsorb a specific gas, but is rather a material whose adsorption/desorption properties express hysteresis with respect to a specific gas. This hysteresis can be utilized for gas separation.

In addition to separation and purification of a gas, the adsorbent according to the present invention can also be employed as a storage material of a specific gas.

This application claims priority from Japanese Patent Application No. 2005-173663 filed Jun. 14, 2005, which is hereby incorporated by reference herein.

What is claimed is:

1. A gas separation method for separating a specific component gas from a mixed gas using an adsorbent, comprising:
  (1) a contact step of bringing a mixed gas into a vessel to contact, at a first pressure, said mixed gas with an adsorbent with respect to which a specific component gas has differences between its adsorption and desorption isotherms;
  (2) a decompression step of decompressing said mixed gas in said vessel to a second pressure, which is lower than the first pressure and which is within a range of pressures at which there are differences between the adsorption and desorption isotherms; and
  (3) a desorption step of causing adsorbed matter to detach by placing the adsorbent at a third pressure, which is lower than said second pressure and which is outside of said range of pressures at which there are differences between the adsorption and description isotherms and/or by heating the adsorbent,
wherein the adsorbent is an organic metal complex represented by general formula (1):

wherein M is a metal atom; and L is a ligand comprising substituted or unsubstituted cyclic groups A and B, where a substituent on the cyclic groups A and B is independently selected from the group consisting of a halogen atom, a nitro group, and a trialkysilyl group, wherein the alkyl group is, independently, a linear or branched alkyl group having 1 to 8 carbon atoms.

2. The gas separation method according to claim 1, wherein a gas detached in the desorption step is collected, and the contact step, the decompression step and the desorption step are repeated with the collected gas as a new mixed gas.

3. The gas separation method according to claim 1, wherein the gas exhausted from the vessel during the decompression step and the gas left in the vessel after the decompression step are recovered, and the contact step, the decompression step and the desorption step are repeated with the recovered gas as a new mixed gas.

4. The gas separation method according to claim 1, wherein a partial pressure of the specific component gas at the first pressure is equal to or greater than a saturated vapor pressure of the specific component gas.

5. The gas separation method according to claim 1, wherein the specific component gas is argon.

6. The gas separation method according to claim 1, wherein the general formula (1) is represented by general formula (2):

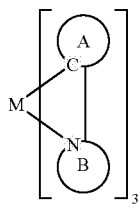

(2)

wherein A and B are the cyclic groups A and B; C and N are ring member atoms, wherein the cyclic groups A and B are bonded to each other directly or through a linear or branched alkyl group having 1 to 20 carbon atoms, wherein one methylene group or two or more methylene groups not adjacent to each other in the alkyl group linking the cyclic groups A and B are optionally substituted with —O—, —S—, —CO—, —CO—O—, —O—CO—, —CH═CH— or —C≡C—, and wherein a hydrogen atom in the alkyl group linking the cyclic groups A and B is optionally substituted with a fluorine atom.

7. A method for producing argon gas comprising the gas separation method according to claim 2 in the process, wherein the specific component gas is argon.

8. A method for producing nitrogen gas comprising the gas separation method according to claim 3 in the process, wherein the mixed gas comprises nitrogen, and the specific component gas is argon.

\* \* \* \* \*